Figure 1:
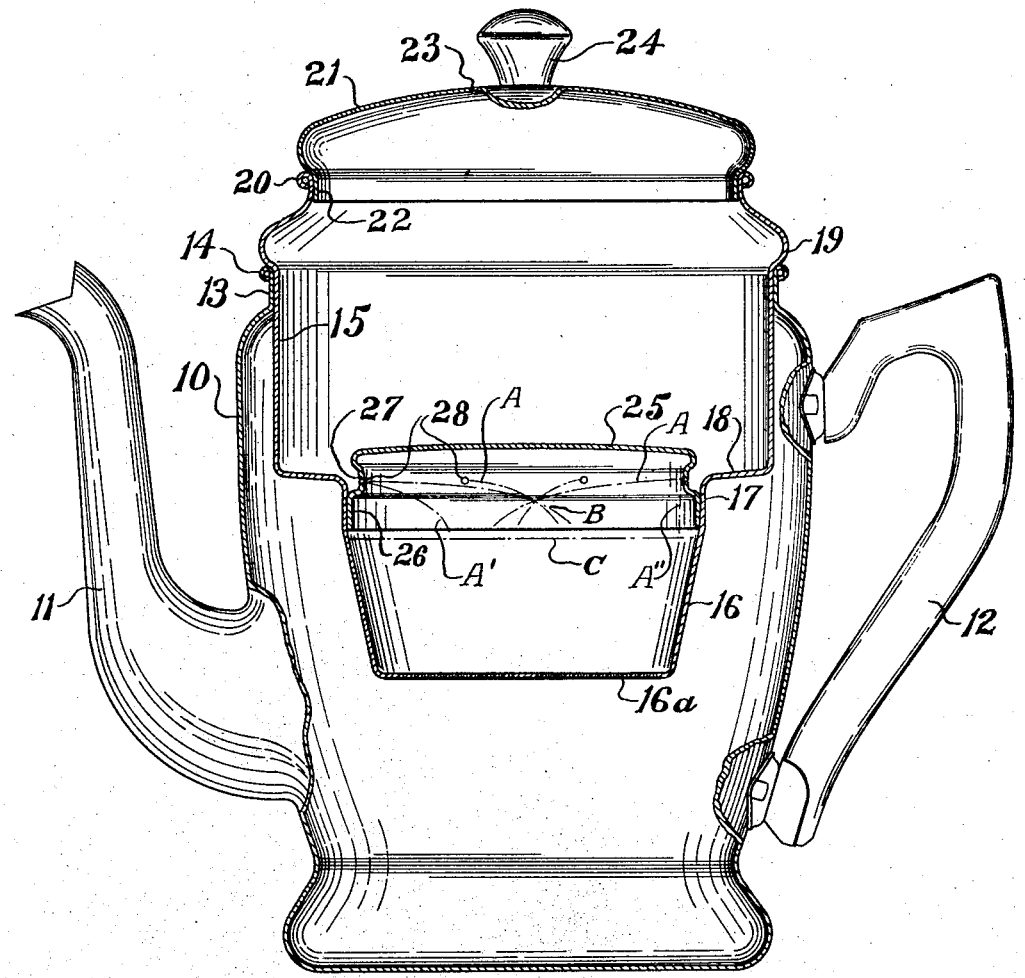

Inventor
R. F. Krause.
By Frease and Bishop
Attorneys

Patented Aug. 16, 1932

1,872,466

UNITED STATES PATENT OFFICE

RICHARD F. KRAUSE, OF MASSILLON, OHIO

DRIP COFFEE MAKER

Application filed November 7, 1930. Serial No. 493,973.

It is common practice in the making of drip coffeepots to provide a ground coffee container having a perforated bottom wall, suspended within a receiving pot or receptacle, a hot water reservoir being located above the ground coffee container and separated therefrom by a horizontal wall provided with perforations whereby boiling water placed in the water reservoir will pass downward in vertical streams through the ground coffee for leaching the same in proper quantities to extract the strength therefrom, the coffee beverage dripping from the perforate bottom of the coffee container into the pot or receptacle.

It has been found by experience that these vertical streams of boiling water passing downward through the ground coffee rapidly bore into the ground coffee, digging wells or cavities of considerable size therein, permitting the boiling water to pass quickly through the ground coffee container at these points, while the remaining portions of the ground coffee are not properly reached by the boiling water. Thus very little of the strength of the coffee is absorbed by the boiling water excepting at the points through which the vertical streams of boiling water are passed.

It will further be seen that the boiling water will pass too rapidly through these points in which the wells or cavities are bored by the action of the water.

The object of the present improvement is to provide an improved drip coffee maker in which the boiling water is sprayed over the entire surface of the ground coffee in the coffee container without the danger of digging wells or cavities in any portions of the ground coffee, thereby providing for a uniform leaching action of the boiling water upon all parts of the ground coffee in the container.

The above and other objects may be attained by providing an imperforate separating wall between the boiling water reservoir and the ground coffee container, said separating wall having a depending annular portion at its periphery provided with spaced minute apertures through which the boiling water issues in radial streams which will at first produce a spray over the central portion of the ground coffee in the container, streams being gradually shortened in length as the pressure is decreased by the boiling water passing from the reservoir.

The boiling water will thus be sprayed over substantially the entire surface of the ground coffee in the container in parabolic streams first spraying upon the coffee at the central portion of the container, the streams gradually lessening in length and covering substantially all portions of the surface of the coffee from the center to the periphery of the container as the pressure is reduced.

It will be seen that by thus spraying the water over the surface of the ground coffee there is no tendency for the streams of boiling water to bore or dig wells or cavities into the coffee, thus permitting the boiling water to pass slowly through substantially all portions of the ground coffee, producing a uniform leaching thereof.

A further object is to provide an inwardly disposed annular portion in the annular depending wall in which the apertures are provided in order to cause the last remaining portions of the boiling water to trickle downward over the surface of the ground coffee instead of passing down along the inner walls of the ground coffee container.

A still further object of the improvement is to form the boiling water reservoir and the ground coffee container in a single unit, the dividing wall therebetween being removable to permit the ground coffee to be placed in the coffee container for use and to be removed therefrom after the coffee beverage has been made.

Figure 2:
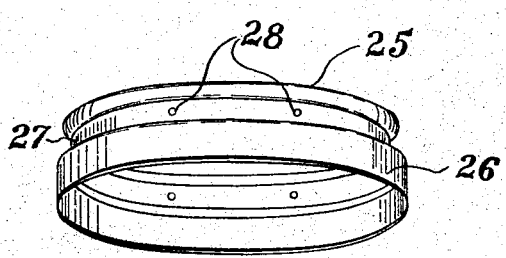

An embodiment of the invention thus set forth in general terms is illustrated in the accompanying drawing, in which Figure 1 is a vertical sectional view through the improved drip coffee maker; and Fig. 2, a detached perspective view of the removable partition wall between the boiling water reservoir and the coffee container.

Similar numerals refer to similar parts throughout the drawing.

The pot 10 for receiving and dispensing the coffee beverage may be of the general design of the usual coffeepot, being provided with a pouring spout 11 and handle 12 preferably at diametrically opposite sides of the pot whereby the same may be easily handled for pouring the contents therefrom through the spout in usual manner.

A restricted neck 13, preferably of substantially cylindric shape, may be formed at the upper open end of the coffee pot, being provided with an outturned annular rim bead 14 at its edge portion.

The hot water reservoir indicated at 15 and the ground coffee container indicated at 16 may be formed as a single unit, the coffee receptacle 16 being preferably tapered toward its lower end and provided with the perforate bottom wall 16a, the upper open end thereof, as shown at 17, being of considerably less diameter than the hot water receptacle and being joined upon or formed integrally with the bottom wall 18 thereof.

The hot water receptacle is of a sufficient diameter to have a sliding fit within the cylindric neck 13 and may be provided at its upper portion with the peripheral shoulder 19 adapted to rest upon the bead 14 of the pot 10 to properly position the hot water receptacle and ground coffee container within the pot.

The upper open end of the hot water receptacle may terminate in an outwardly rolled peripheral bead 20 and a cover 21 provided with a depending annular flange 22 to be received within the upper open end of the hot water receptacle, may be provided for normally closing the same, said cover preferably having an opening 23 therein to permit air to enter the hot water receptacle so as to prevent the formation of a vacuum as the hot water passes out of the receptacle. A knob 24 of usual and ordinary construction may be provided for removing or replacing the cover upon the hot water receptacle.

The dividing or partition wall 25, between the hot water receptacle and the coffee container, is preferably removable, substantially horizontally disposed and is imperforate as shown in the drawing. This wall is provided with a depending peripheral flange 26 adapted to snugly fit within the upper end portion 17 of the coffee container, said flange being provided with the inwardly disposed annular groove portion 27 provided with sundry minute apertures 28, six of such apertures being shown in the drawing.

In the operation of the improved coffee maker for making drip coffee, the cover 21 is removed from the hot water receptacle and the removable partition wall 25 is removed, the annular depressed portion 27 thereof providing means for easily engaging the removable wall by the finger tips to remove the same.

The proper amount of ground coffee is then placed in the coffee container and the partition wall 25 is replaced in position as shown in Fig. 1, after which the desired amount of boiling water is poured into the reservoir 15, the cover 21 being then replaced thereon.

The hot water receptacle being substantially filled with water, the pressure thereof is sufficient to discharge the hot water through the small apertures 28 in radial streams substantially as shown at A in Fig. 1 in dot and dash lines, the streams being projected to the center of the coffee container where they converge forming more or less of a spray, as indicated at B, upon the central portion of the ground coffee in the container 16 which may be substantially at the level indicated by the dot and dash line C.

As the water level is lowered in the hot water reservoir and the pressure gradually reduced, these streams will be gradually shortened and will fall upon points further away from the center of the coffee container.

When substantially half of the water has been discharged from the reservoir the streams may assume the parabolic shape as indicated at A' in Fig. 1 and as the water is substantially all discharged from the reservoir the small remaining portion thereof will drip downward from the inwardly disposed portion 27 of the partition wall, substantially as shown by the line A'' in Fig. 1.

It will be seen that this inwardly disposed portion 27 of the partition wall causes this small remaining portion of the hot water to strike the coffee in the container 16 at a point spaced from the side wall thereof, thus preventing this portion of the water from passing down along the wall without extracting any strength from the coffee.

By thus spraying the water over the entire surface of the ground coffee there are no wells or cavities bored or dug into the ground coffee allowing the water to rapidly pass through the same without extracting the strength from the coffee, but rather all portions of the ground coffee will be reached by the sprays of boiling water which will slowly pass through the ground coffee, producing the proper leaching action to extract the desired amount of strength from the coffee, the coffee beverage thus produced dripping through the perforate bottom wall of the coffee container into the receiving pot or receptacle 10.

I claim:

1. A drip coffee maker including a water reservoir, a coffee container below the water reservoir, an imperforate substantially longitudinal partition wall between the water reservoir and coffee container, and a depending flange around the edge of the partition wall provided with an inwardly disposed portion having spaced apertures therein.

2. A drip coffee maker including a water reservoir, a coffee container of smaller diameter than the water reservoir below and fixed to the water reservoir and having an upper open end, a removable substantially horizontal partition wall between the water reservoir and the coffee container, said partition wall having a depending peripheral flange snugly fitting within the upper open end of the coffee container, and said flange being provided with an inwardly disposed annular groove portion having spaced apertures formed therein.

In testimony that I claim the above I have hereunto subscribed my name.

RICHARD F. KRAUSE.